United States Patent
Wang et al.

(10) Patent No.: US 9,374,768 B2
(45) Date of Patent: Jun. 21, 2016

(54) CELLULAR BROADCAST ENHANCEMENTS FOR INTER-SYSTEM MOBILITY

(71) Applicant: Broadcom Corporation, Irvine, CA (US)

(72) Inventors: Shao-Cheng Wang, Santa Clara, CA (US); Pavan Santhana Krishna Nuggehalli, Mountain View, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/332,413

(22) Filed: Jul. 16, 2014

(65) Prior Publication Data

US 2015/0038142 A1 Feb. 5, 2015

Related U.S. Application Data

(60) Provisional application No. 61/860,878, filed on Jul. 31, 2013.

(51) Int. Cl.
*H04M 1/00* (2006.01)
*H04W 48/12* (2009.01)
*H04W 84/12* (2009.01)
*H04W 88/06* (2009.01)

(52) U.S. Cl.
CPC .............. *H04W 48/12* (2013.01); *H04W 84/12* (2013.01); *H04W 88/06* (2013.01)

(58) Field of Classification Search
CPC ..... H04W 48/10; H04W 48/12; H04W 48/17; H04W 48/18; H04W 48/20; H04W 68/00; H04W 68/12; H04W 84/12; H04W 88/06; H04W 36/00; H04W 36/04; H04W 36/06

USPC ........ 455/414.1, 435.2, 435.3, 436, 437, 438, 455/449, 450, 451, 452.1, 453, 552, 552.1

See application file for complete search history.

(56) References Cited

U.S. PATENT DOCUMENTS

| | | | | |
|---|---|---|---|---|
| 2014/0161103 A1* | 6/2014 | Sirotkin | ................ | H04W 24/10 370/332 |
| 2014/0171097 A1* | 6/2014 | Fischer | ................... | H04W 4/02 455/456.1 |
| 2014/0301251 A1* | 10/2014 | Chen | ..................... | H04W 72/02 370/278 |
| 2015/0148050 A1* | 5/2015 | Siomina | ................ | H04J 11/005 455/452.1 |

* cited by examiner

*Primary Examiner* — Jean Gelin
(74) *Attorney, Agent, or Firm* — Garlick & Markison; Bruce E. Garlick

(57) ABSTRACT

Methodologies and apparatus to support interworking operations between a cellular radio area network (RAN) and a wireless local area network (WLAN) utilizing broadcast RAN assistance information. In various embodiments, a RAN (such as a LTE/LTE-advanced RAN) transmits RAN assistance information to a multimode user equipment (UE) for use in network selection and traffic steering operations. Certain parameters, such as RAN load assistance information, may be transmitted in a first format or a second, less granular format that changes relatively infrequently over time as compared to the first format. A system information broadcast procedure utilizing a paging message is employed to transmit information in the second format. The paging message may include a change notification flag that triggers a UE to initiate a system information acquisition procedure to a retrieve system information message(s) including the relevant interworking parameters.

20 Claims, 8 Drawing Sheets

US 9,374,768 B2

CELLULAR BROADCAST ENHANCEMENTS FOR INTER-SYSTEM MOBILITY

CROSS REFERENCE TO RELATED PATENTS/PATENT APPLICATIONS

Provisional Priority Claims

The present U.S. Utility patent application claims priority pursuant to 35 U.S.C. §119(e) to U.S. Provisional Application No. 61/860,878, entitled "CELLULAR BROADCAST ENHANCEMENTS FOR INTER-SYSTEM MOBILITY", filed Jul. 31, 2013, which is hereby incorporated herein by reference in its entirety and made part of the present U.S. Utility patent application for all purposes.

BACKGROUND

1. Technical Field

The disclosure relates generally to wireless communications and, more particularly, it relates to broadcasting of radio area network (RAN) assistance information for use in inter-system mobility.

2. Description of Related Art

In modern communication systems, mobile devices often roam in a manner that implicates different communication backbones, technologies, protocols and/or service providers. Support for such roaming, including network selection and traffic steering operations, is sometimes referred to as inter-system mobility or interworking.

In addition, the growing number of services and devices being offered by network operators and device manufacturers help continue an increase in network load factors, which may in turn place constraints on network data throughputs and quality of service. New techniques are constantly being sought to improve the customer experience, including techniques that utilize data capacity available across multiple networks. For example, use of cellular broadcasts to support inter-system mobility—such as interworking scenarios involving radio area networks (RANs) and wireless local area networks (WLANs)—is the subject of ongoing research.

DETAILED DESCRIPTION

In various exemplary embodiments of this disclosure, a wide range of RAN assistance information is employed to support inter-system mobility. In certain embodiments, novel mechanisms and corresponding standardization enhancements are provided to enable efficient transmission of different kinds of RAN assistance information in cellular networks, such as Long Term Evolution (LTE)/LTE-Advanced, Universal Mobile Telecommunications Service (UMTS), or other 4G/5G networks. Such mechanisms are applicable to a wide range of devices/UE, such as multimode mobile devices (e.g., smartphones, tablet devices, mobile computing devices, etc.).

The embodiments described below may be practiced in a variety of evolving and future communication networks that utilize wireless technology for communications between a transmission source or sources and a receiving device utilizing one or more communication protocols to transfer system information, voice, video, data and/or other types of information. The particular technology described below pertains generally to LTE/LTE-Advanced (or 3GPP) communication standards (and subsequent Releases) as applied to mobile devices such as cellular telephones. However, implementations need not be limited to these particular standards, and other communication standards and protocols may be applicable for use with the described embodiments and/or other embodiments.

In at least some aspects of the disclosure, the exemplary procedures used to broadcast and disseminate RAN assistance information are carefully designed to ensure that the performance of existing cellular networks is not unnecessarily impacted. For example, in typical cellular networks, UEs are able to save energy by transitioning to idle mode when there is no traffic to send or receive. Idle UEs are generally notified of a change in system information via a paging procedure. If assistance information changes reasonably rapidly and is treated as a change in system information, then there is a potential risk of awakening UEs more frequently than necessary. Frequent wake-ups are particularly wasteful for legacy UEs that may not be able to support the broadcasted assistance information. Further, it can be important to ensure that the relevant paging channel is not overly burdened, as such channels are generally not designed for broadcasting frequently changing information.

The novel broadcast procedures for assistance information disclosed herein take into account the distinct characteristics of the different parameters involved, e.g., the frequency with which such parameters are updated and the format of the parameters (numeric or label based). Briefly, and by way of example, RAN assistance information may include RAN load information, RAN/WLAN signal thresholds, and WLAN network selection parameters. Such assistance information is described more fully below in conjunction with FIG. 4.

Figure 1:
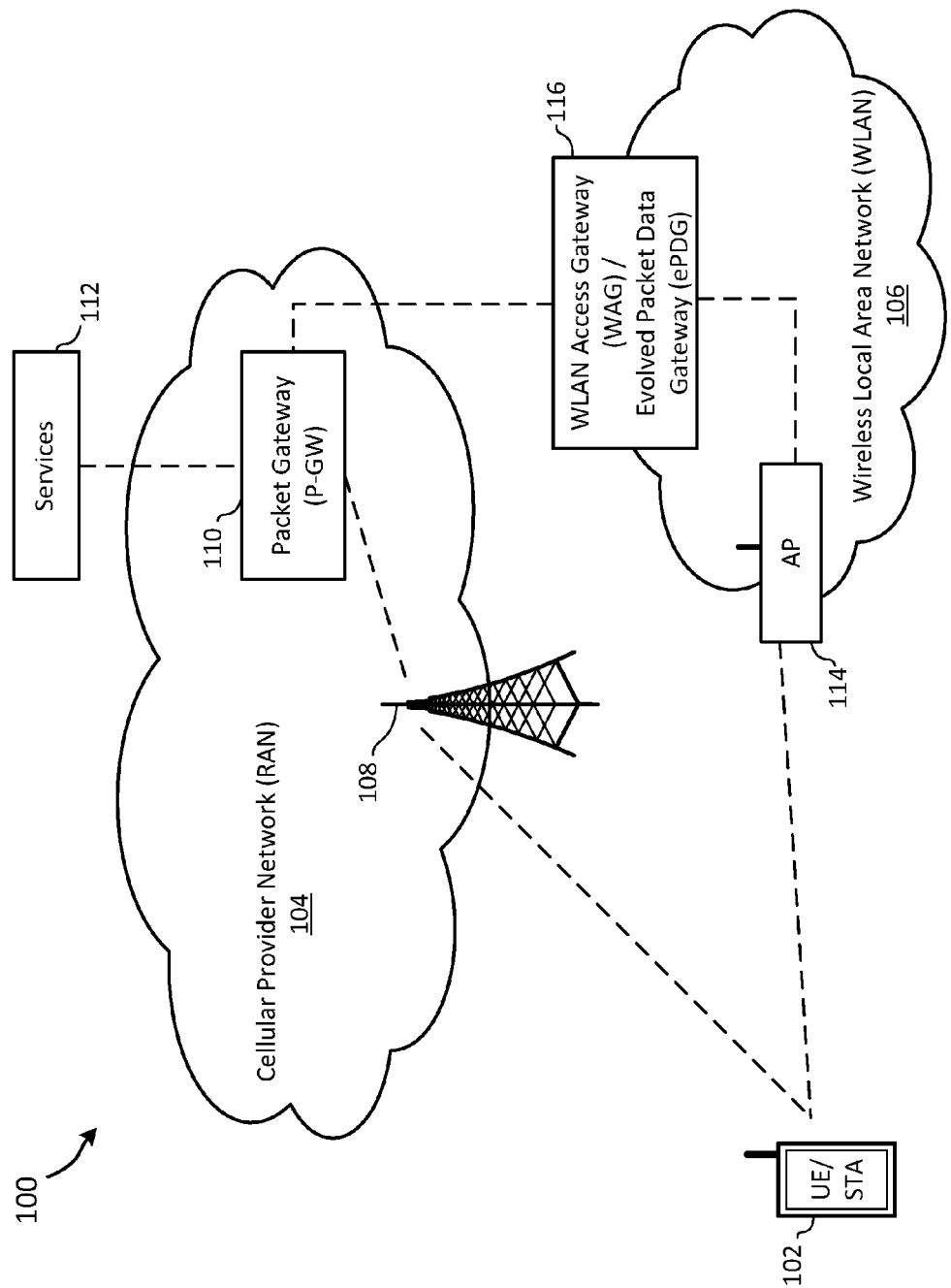
FIG. 1 illustrates a block diagram of an example communication system that provides wireless communications in accordance with aspects of the disclosure.

Referring more particularly to FIG. 1, a block diagram is shown of an example communication system 100 that provides wireless communications in accordance with aspects of the disclosure. In the illustrated system, a User Equipment/STAtion (UE/STA or UE) 102 is communicatively coupled to a cellular provider network (or radio area network (RAN)) 104 and a wireless local area network (WLAN) 106 via one or more cellular base stations 108 and a wireless access point (AP) 114, respectively. The cellular base station 108 is commonly referred to as Node B or eNB in LTE/LTE-Advanced networks and other standards developed under the 3rd Generation Partnership Project (3GPP). The WLAN 106 may be implemented in accordance with one or more communication standards or protocols including, for example, at least one version of an IEEE 802 wireless communication standard (e.g., 802.11a, 802.11b, 802.11g, 802.11n, 802.11ac, etc.) and variants thereof.

The cellular provider network 104 includes a packet gateway (P-GW) 110 that may communicate with a WLAN access gateway (WAG)/evolved packet data gateway (ePDG) 116 of the WLAN 106. Various services 112 may be provided to the UE/STA 102 via the cellular provider network and/or WLAN 106. In various disclosed embodiments, a base station 108 of a RAN 104 is configured to provide RAN assistance information to a UE 102 through broadcast signaling.

Figure 2:
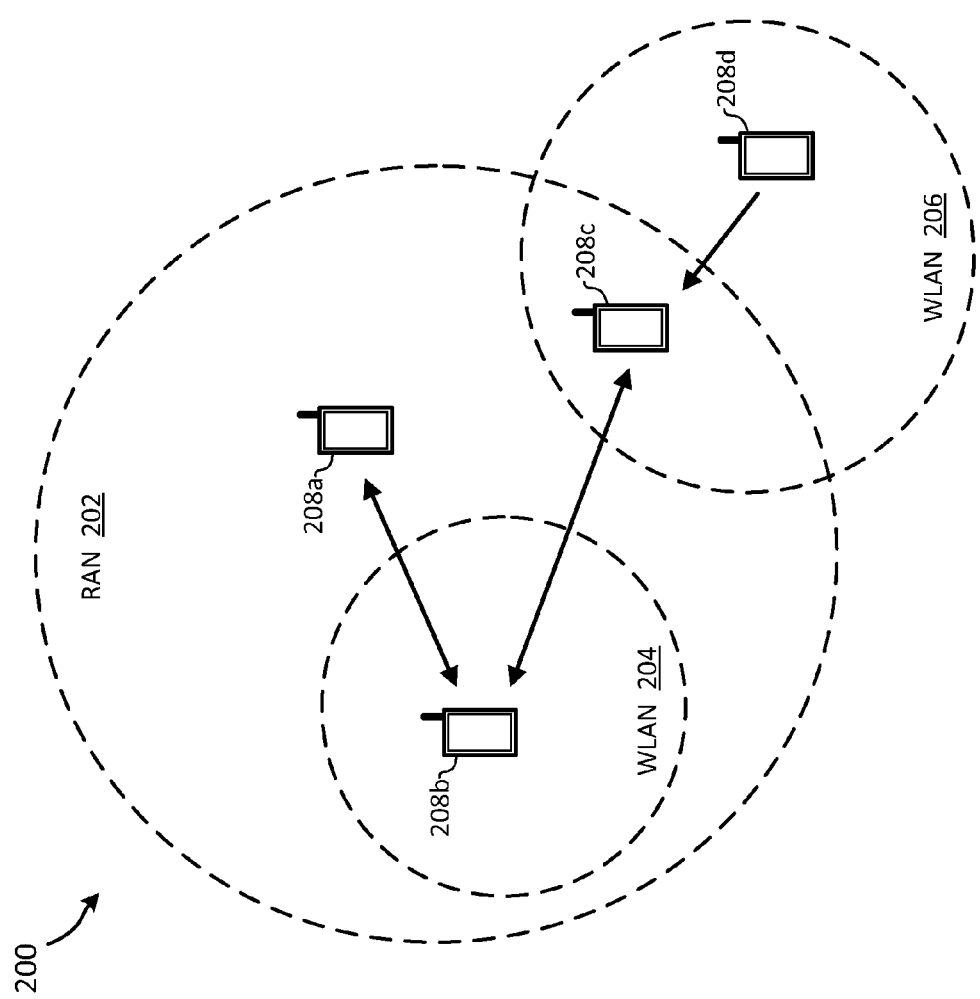
FIG. 2 is a diagram illustrating exemplary locations of a multimode communication device within different network types and coverage areas.

FIG. 2 is a diagram 200 illustrating exemplary locations of a multimode communication device within different network types and coverage areas. In particular, locations 208a-d of a UE 208 within coverage areas of a RAN 202, a WLAN 204 and a WLAN 206 is shown to illustrate various scenarios in which (broadcast) interworking assistance information— such as radio link quality, backhaul network quality, network loading, etc.—might be utilized to perform functions such as network selection, traffic steering, (bi-directional) load balancing, etc. The RAN assistance information broadcasts described herein may be used in conjunction with carrier WLAN deployments in which the RAN 202 and the WLAN 204 are operated or controlled by a common service provider, interactions between independent or partnered WLAN providers and cellular operators, etc.

Relevant interworking scenarios may include, without limitation, network selection scenarios in which the UE 208: (1) is within and using RAN coverage and moves to WLAN coverage (208a to 208b, 208b to/from 208c, etc.) or (2) is using WLAN within both coverages and moves to RAN coverage (208b to 208a, 208d to 208c, etc.); and traffic steering or load balancing scenarios in which the UE 208 is within both RAN and WLAN coverage (208b and 208c) and the UE is (3) using WLAN and traffic should be moved to RAN, (4) using RAN and traffic should be moved to WLAN, (5) is using both coverages and certain traffic should be moved from one to the other.

Figure 3:
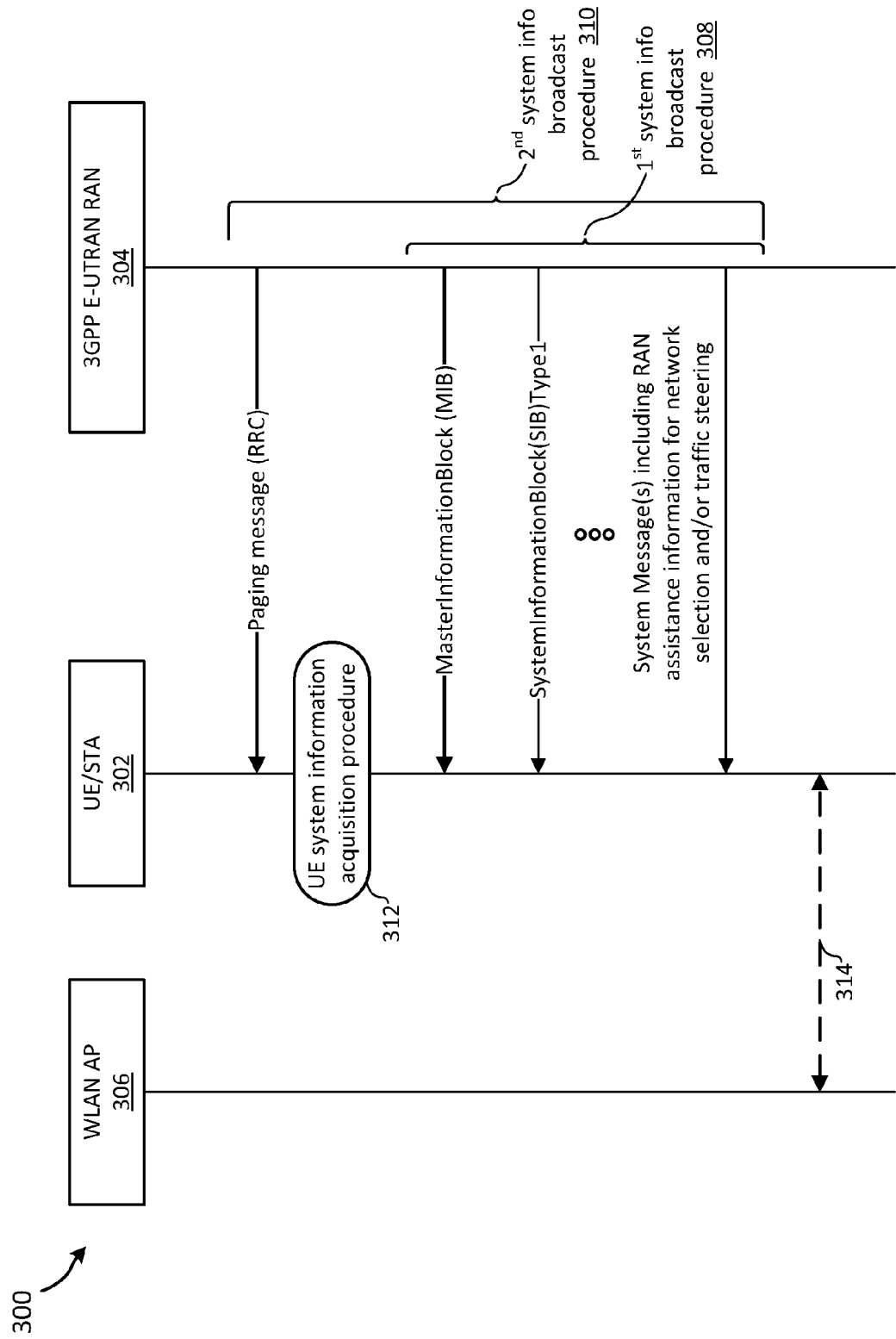
FIG. 3 is a signaling diagram illustrating exemplary broadcast procedures for communicating RAN assistance information.

FIG. 3 is a signaling diagram 300 illustrating exemplary broadcast procedures for communicating RAN assistance information. In particular, broadcast signaling from a 3GPP E-UTRAN RAN 304 to a UE/STA ("UE") 302 is illustrated. In this embodiment, RAN assistance information may be broadcast using either or both of a first system information broadcast procedure 308 and a second system information broadcast procedure 310.

In the first system information broadcast procedure 308, RAN assistance information for interworking operations such as network selection and traffic steering is included in one or more system information blocks (SIBs). The SIB(s), examples of which are described below, are mapped to one or more system information (SI) messages. The first system information broadcast procedure is initiated (or repeated) by first broadcasting a master information block (MIB). The MIB typically contains a limited number of the most essential and most frequently transmitted parameters that are used to acquire other information from the RAN 304. The UE 302 may read the MIB following an initial cell synchronization process or other trigger event(s), such as a request for information from upper layers of a communication or interworking protocol stack.

The MIB is followed by an associated SIB Type1 which functions, in part, to provide scheduling information for additional SIBs, including mapping of SIBs to SI messages. In accordance with this scheduling, at least one SI message that contains a SIB with relevant RAN assistance information is broadcast to the UE 302 for use in performing interworking operations.

In the second system information broadcast procedure 310, a paging message (e.g., a LTE RRC Paging message) is utilized by the RAN 304 to indicate the presence of RAN assistance information, which may include updated RAN assistance information. In some embodiments, the paging message may include a flag or other notification mechanism to indicate the availability of such information. Upon receiving such a paging message, the UE 302 of the illustrated embodiment initiates or performs a UE system information acquisition procedure 312. The remaining steps of the second system information broadcast procedure 310 generally align with the steps of the first system information broadcast procedure 308. In various embodiments, the UE 302 may perform interworking operations utilizing information (including assistance information) from a WLAN AP 306 provided via one or more communications 314 occurring at various times.

Figure 4:
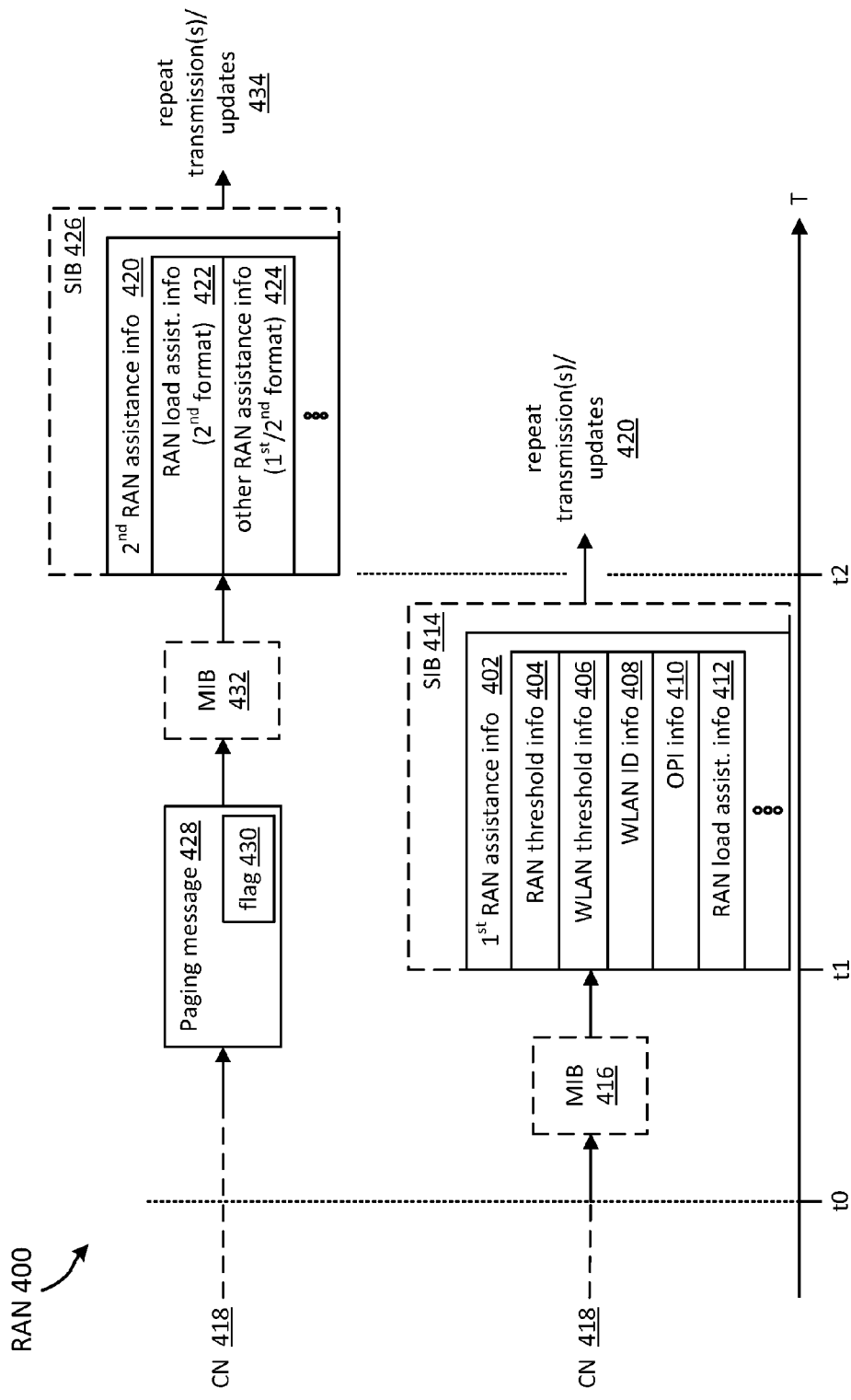
FIG. 4 illustrates exemplary embodiments of broadcast procedures for communicating a first set of RAN assistance information parameters and a second set of RAN assistance information parameters.

FIG. 4 illustrates exemplary embodiments of broadcast procedures for communicating a first set of RAN assistance information/parameters and a second set of RAN assistance information/parameters in a RAN 400. Many different types of RAN assistance information and combinations thereof may be utilized in conjunction with the illustrated procedures.

For example, RAN load assistance information, which provides indications of LTE/UMTS load to a UE, may be included. This parameter is expected to change rather frequently (in seconds or minutes). However, RAN load assistance information may be presented in different formats, e.g., in a numeric percentage format or in load levels (low, medium, high). For a numeric percentage format, the percentage value may change relatively frequently to reflect the exact load level. For pre-set level formats, each load level indictor may map to a range of RAN load values. In one example, a low indicator maps to "0-33", a medium indicator maps to "34-66", and a high indicator maps to "67-100". As a result, the load level indicator should change relatively infrequently as compared to a numeric percentage format.

In other examples, RAN and WLAN thresholds may be provided by the LTE/UMTS network, which set these thresholds based on its load and operator preferences. The following parameters, which are expected to change rather infrequently (in the order of hours or days), can be considered as RAN and WLAN thresholds for purposes of interworking: (1) RAN thresholds such as Reference Signal Received Power (RSRP) and Reference Signal Received Power (RSCP) thresholds; and (2) WLAN thresholds such as Received Signal Strength Indicator (RSSI), Received Channel Power Indicator (RCPI), and Received Signal to Noise Indicator (RSNI) thresholds, BSS load thresholds, WAN metric thresholds, etc. For example, operators may direct the offloading of traffic to WLAN for UE's receiving RAN signals below certain RSRP/ RSCP thresholds, or steer UE traffic to WLAN when WLAN measurements are above the thresholds indicated by the network.

In yet another example of RAN assistance information, WLAN network selection assistance information may be provided by a LTE/UMTS network to assist UEs in WLAN network selection procedures. Example parameters include operator preferred WLAN SSID, WLAN operating frequencies and ranges of relevant APs, etc. This information is expected to change infrequently.

In various embodiments such as set forth herein, the assistance information parameters may be classified as frequently changing parameters and infrequently changing parameters, and broadcast procedures are established for each. These broadcast procedures take into consideration, for example, requirements for disseminating and processing frequently changing parameters such as RAN load information in a manner that does not result in unnecessary waking of legacy UEs and the resulting waste of battery power. Further, when RAN load information changes, it is expected that UEs will take into account the new value in a timely manner to achieve operator intended objectives such as load balancing and QoS fulfillment.

Referring more particularly to the exemplary broadcast procedures of FIG. 4, broadcast procedures are illustrated for communicating a first set of RAN assistance information/parameters and a second set of RAN assistance information/parameters. In a first such broadcast procedure, first RAN assistance information 402 is broadcast by the RAN 400 at a time t1. The first RAN assistance information 402 may include, for example, one or more of the following: RAN threshold information 404, WLAN threshold information 406, WLAN identification information 408, Offload Preference Indicator (OPI) information 410, RAN load assistance information 412, etc. In certain embodiments, the RAN load assistance information 412 is provided in a first format such as a percentage value that reflects a precise load level.

In a second broadcast procedure, second RAN assistance information 420 is broadcast by the RAN 400 at a time t2. The second RAN assistance information 420 may include, for example, one or more of RAN load assistance information 422 and other RAN assistance information 424. In certain embodiments, the RAN load assistance information 422 may be provided in a second format that is less granular than the first format (e.g., a load level format). In general, it is expected that t2-t0 will typically be greater than t1-t0.

In embodiments compliant with one or more LTE/LTE-Advanced standards, the SIBs 414 and 426 may be broadcast in accordance with scheduling information identified by MIBs 416 and 432, respectively. In the case of SIB 426, retrieval of relevant RAN assistance information by a UE is initiated by a paging message 428 which may include, in some embodiments, a change notification indicator or flag 430 that triggers the UE to initiate a system information acquisition procedure.

Either of the illustrated broadcast procedures may utilize information, rules and/or commands provided by a core network (CN) 418. In certain embodiments, information, rules and/or commands may be provided by a dedicated interworking mechanism or function, such as an Access Network Discovery and Selection Function (ANDSF) that may be utilized to assist a UE in discovering non-3GPP access networks in its vicinity and to provide rules or policies for use in prioritizing and managing network connections. Certain information, such as OPI information 410, may be broadcast in support of such functions. Further, either broadcast procedure may include repeat transmissions/updates of relevant RAN assistance information (420 and 434) on a fixed schedule/periodicity.

Figure 5:
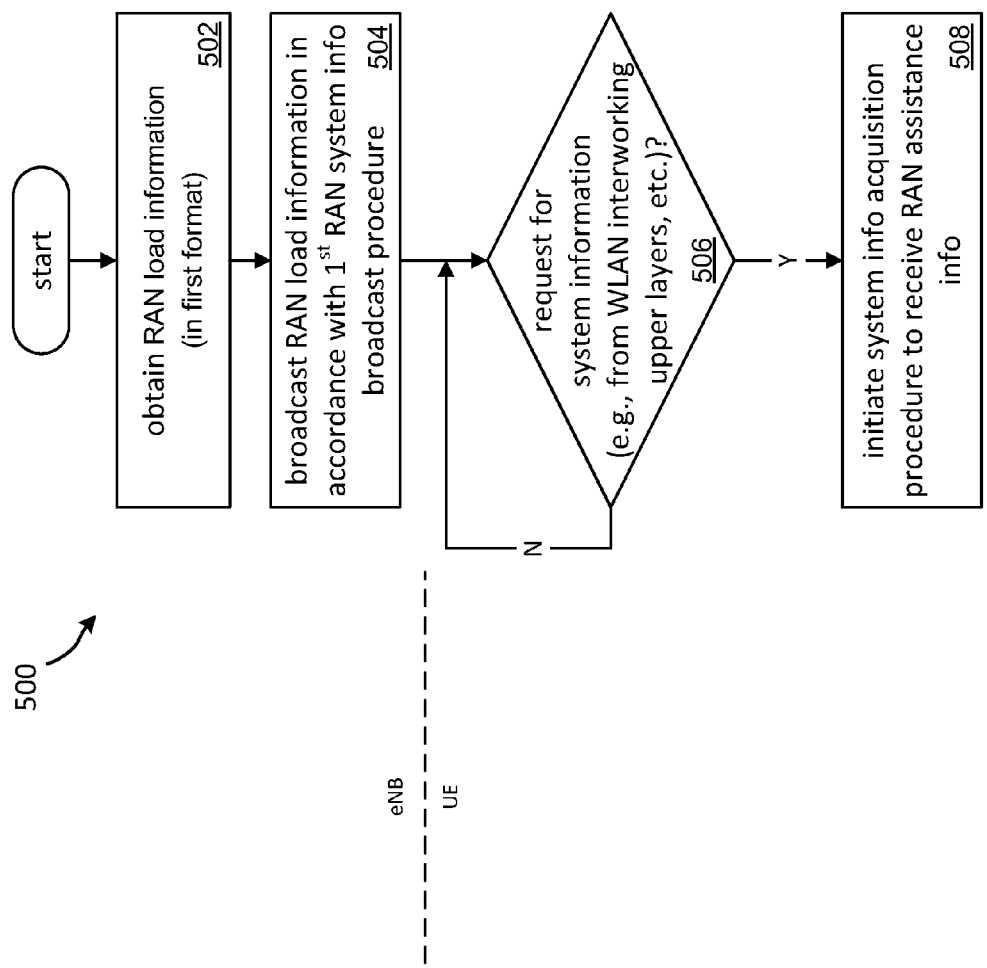
FIG. 5 is an operational flow diagram illustrating an exemplary method for communicating a first type of RAN assistance information/parameters.

FIG. 5 is an operational flow diagram illustrating an exemplary method 500 for communicating first type of RAN assistance information/parameters. In this example, the RAN assistance information includes RAN load information obtained, measured or otherwise generated by a RAN (502). The RAN load information may be expressed in a first format having values that change relatively frequently as compared to other RAN assistance information. For example, the first format may be a percentage value that reflects a precise load level.

Next (504), the RAN load information is broadcast in accordance with a first RAN system information broadcast procedure such as that described in conjunction with FIG. 4. For example, the RAN load information may be included in an SIB in a LTE/LTE-Advanced RAN.

The broadcast procedure of this embodiment may not necessarily result in a notification to a desired recipient UE(s). Instead, it may be the responsibility of the UE to retrieve the broadcast information, which may occur on a regular basis, in response to a request for system information from upper layers of a communication/WLAN interworking stack or other trigger event (506), etc. In response to such a request, a recipient UE of this embodiment initiates a system information acquisition procedure to receive RAN assistance information (508), including the RAN load information broadcast in accordance with the first RAN system information broadcast procedure.

In certain embodiments, the RAN assistance information is included in a new SIB type that accommodates RAN load information. One such SIB type (applicable to certain 3GPP LTE/LTE-Advanced specifications), in which the first format is a percentage value 0-100, is shown below by way of example and without limitation:

SystemInformationBlockTypeXX
The IE SystemInformationBlockTypeXX contains information relevant to RAN load information for WLAN/3GPP radio interworking
SystemInformationBlockTypeXX Information Element

```
-- ASN1START
SystemInformationBlockTypeXX-r12 ::= SEQUENCE {
    ranLoadindicator1 INTEGER (0..100) OPTIONAL, -- Need ON
}
-- ASN1STOP
```

Figure 6:
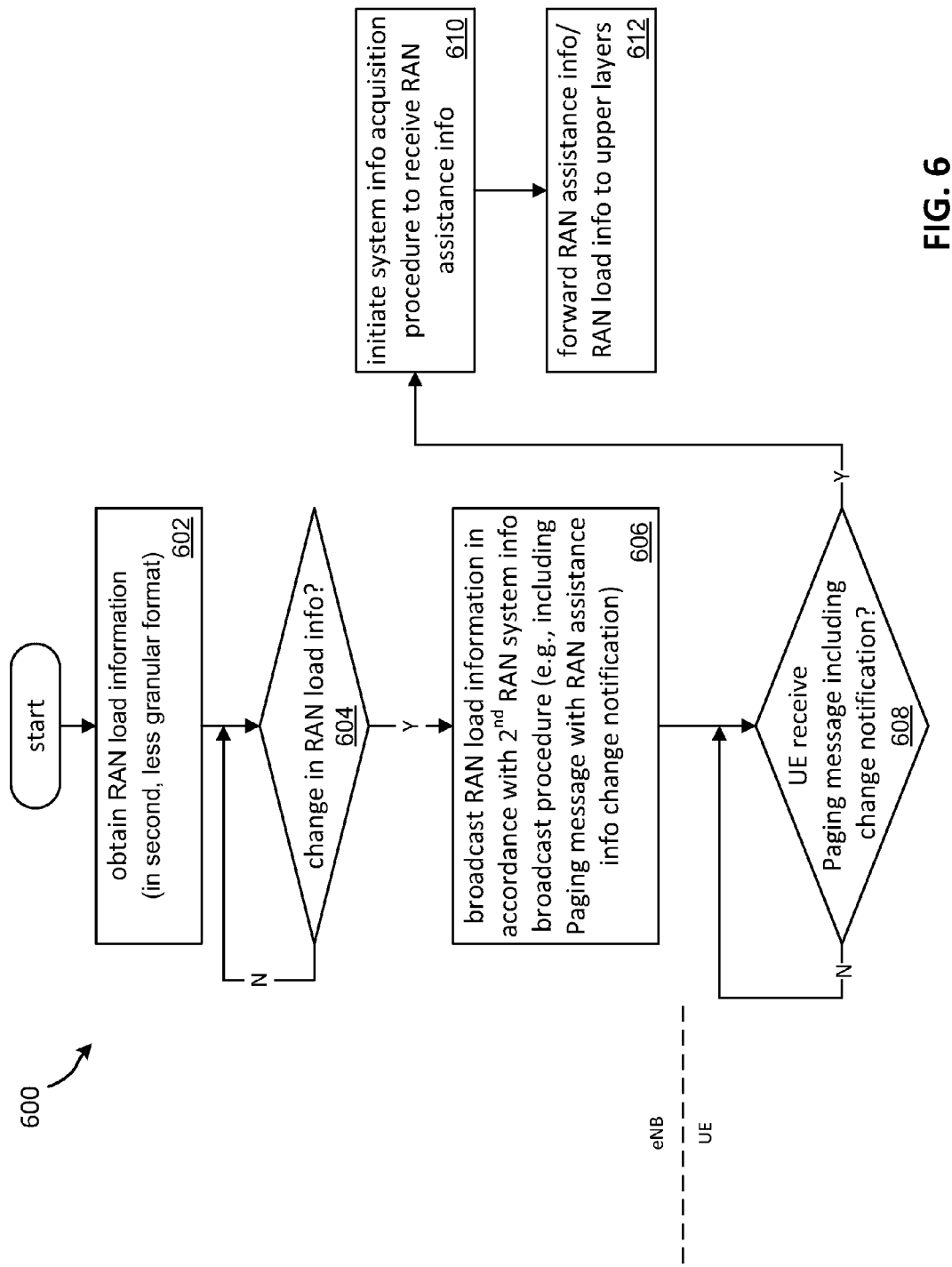
FIG. 6 is an operational flow diagram illustrating an exemplary method for communicating a second type of RAN assistance information/parameters.

FIG. 6 is an operational flow diagram illustrating an exemplary method 600 for communicating a second type of RAN assistance information/parameters. In this example, the RAN assistance information includes RAN load information obtained, measured or otherwise generated (602) in a second format that is less granular (and less likely to result in changes) than the first format.

For example, the second format may be a pre-set level format, wherein each load level indictor maps to a range of RAN load values (e.g., a low indicator maps to "0-33", a medium indicator maps to "34-66", and a high indicator maps to "67-100"). Such load level indicators should not change as frequently as indicators provided in a numeric percentage or similar format.

In the illustrated method, upon detection (604) of any change in a broadcast RAN load level, the updated RAN load information is broadcast (606) in accordance with a second RAN system information broadcast procedure such as that described in conjunction with FIG. 4. For example, the second broadcast procedure may include a paging message including a RAN assistance information change notification or flag. Upon receiving such a paging message (608), a recipient UE of the illustrated embodiment immediately initiates a system information acquisition procedure to receive RAN assistance information (610), including the RAN load information broadcast in accordance with the first RAN system information broadcast procedure. The RAN assistance information/RAN load information is then forwarded to upper layers (612).

With general reference to the 3GPP LTE/LTE-Advanced specifications and by way of example, the second RAN system information broadcast procedure may be implemented as follows:

- A RAN load information change notification is included in a Paging message to inform WLAN interworking capable UEs in an idle state (RRC_IDLE) and UEs in connected state (RRC_CONNECTED) about change of RAN load information. The change of RAN load information includes the situations wherein a RAN starts or stops broadcasting RAN load information.
- If the UE receives a Paging message including the RAN load information change notification, it shall start receiving the RAN load information defined in the corresponding SIB type according to schedulingInfoList in a SystemInformationBlockType1.
- If the UE receives a Paging message including the RAN load information change notification while it is acquiring a RAN load information parameter, the UE shall continue based on the previously acquired schedulingInfoList until it re-acquires schedulingInfoList in a SystemInformationBlockType1.
- An optimization for consolidating Paging messages for a different purpose can be applied. If the eNB knows when changes are forthcoming which will invoke unrelated Paging message notifications, the Paging message for a RAN load information change notification can "piggyback" in the same Paging message used to notify other use cases (e.g., ETWS/CMAS/ACB). If there are no Paging message notification consolidation opportunities, a stand-alone Paging message may be invoked to support a RAN load information change notification.
- The UE shall apply the system information acquisition procedure upon selecting (e.g., upon device power on) and upon reselecting a cell, after handover completion, after entering E-UTRA from another radio access technology (RAT), upon return from out of coverage, upon receiving an indication of a change of RAN load information, etc.
- A new SIB type (e.g., a SystemInformationBlockTypeYY such as shown below) is used to accommodate RAN load information:
  SystemInformationBlockTypeYY The IE SystemInformationBlockTypeYY contains information relevant to RAN load information for WLAN/3GPP radio interworking SystemInformationBlockTypeYY Information Element

```
-- ASN1START
SystemInformationBlockTypeYY-r12 ::= SEQUENCE {
  ranLoadindicator2 ENUMERATED {high, medium, low}
    OPTIONAL, -
  - Need ON
}
-- ASN1STOP
```

Paging Message

```
Paging-v12xy-IEs ::= SEQUENCE {
  Ran-load-modification-r12 ENUMERATED {true} OPTIONAL,
  -- Need ON
  nonCriticalExtension SEQUENCE { } OPTIONAL -- Need OP
}
```

Figure 7:
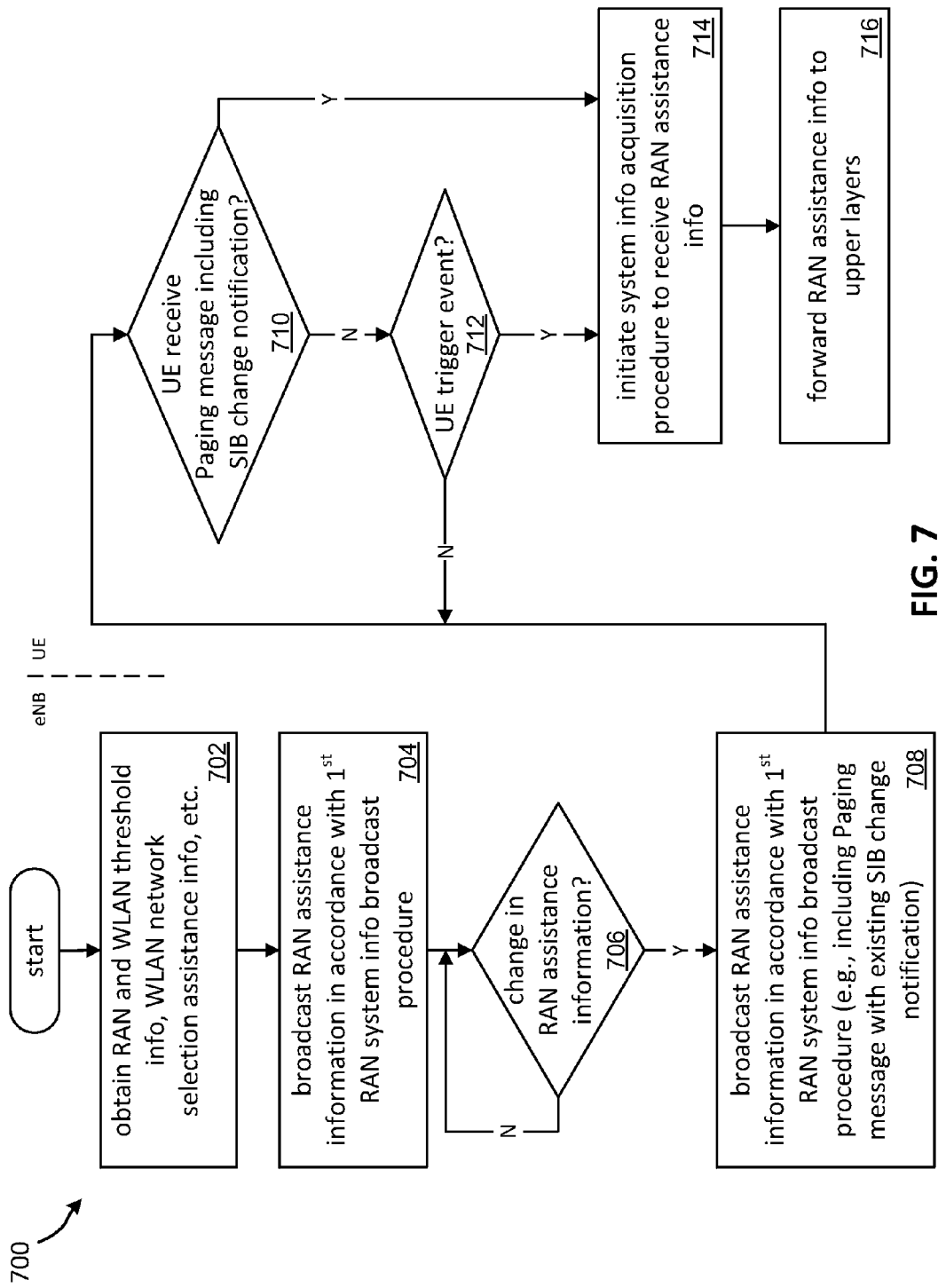
FIG. 7 is an operational flow diagram illustrating an exemplary method for communicating relatively static RAN assistance information.

FIG. 7 is an operational flow diagram illustrating an exemplary method 700 for communicating relatively static RAN assistance information. The illustrated method recognizes that certain parameters, such as RAN and WLAN thresholds and WLAN network selection assistance information, do not change frequently (e.g., in the order of hours). The current SIB modification boundary concept in LTE/LTE-Advanced, for example, may be appropriate for broadcasting updates to such parameters/information, and the acquisition of such parameters/information should be optional and typically only performed by interworking capable UEs.

In the illustrated method, the RAN assistance information includes RAN and WLAN thresholds and WLAN network selection assistance information obtained, measured or otherwise generated (702) by the RAN. This RAN assistance information is then broadcast (704) in accordance with a first RAN system information broadcast procedure such as the procedure described in conjunction with FIG. 5. For example, the RAN load information may be included in an SIB in a LTE/LTE-Advanced RAN.

In addition, upon detection of a change in broadcast RAN assistance information (including, for example, RAN load assistance information in certain embodiments) (706), the updated RAN assistance information is broadcast (708) in accordance with a RAN system information broadcast procedure. For example, the broadcast procedure may include a paging message including an existing LTE SIB modification/change notification.

Upon receiving such a paging message (as detected in 710), a recipient UE of the illustrated embodiment initiates a system information acquisition procedure to receive RAN assistance information (714) immediately from the start of the next modification period. This system acquisition procedure may also be initiated in response to a UE trigger event (as detected in 712), such as a request for system information from upper layers of a communication stack. The RAN assistance information may then forwarded to upper layers (714).

With general reference to the 3GPP LTE/LTE-Advanced specifications and by way of example, the RAN system information broadcast procedure of the illustrated embodiment may be implemented as follows:

- A new SIB type (such as SystemInformationBlockTypeZZ illustrated below) is used to accommodate RAN and WLAN thresholds and WLAN network selection assistance information. Following a request from upper layers, the UE shall acquire SystemInformationBlockTypeZZ and then forward the received RAN and WLAN thresholds and WLAN network selection assistance information to the upper layers.
- The UE shall apply the system information acquisition procedure, including acquisition of RAN and WLAN threshold and "WLAN network selection assistance information in the corresponding SIB type (SystemInformationBlockTypeZZ), upon selecting (e.g., upon device power on) and upon reselecting a cell, after handover completion, after entering E-UTRA from another RAT, upon return from out of coverage, upon receiving a Paging message notification that the system information has changed, etc.
  SystemInformationBlockTypeZZ The IE SystemInformationBlockTypeZZ contains information relevant to RAN and WLAN thresholds and WLAN network selection assistance information for WLAN/3GPP radio interworking

```
-- ASN1START
SystemInformationBlockTypeZZ-r12 ::= SEQUENCE {
   ranInterworingRSRPThreshold RSRP-Range OPTIONAL, -- Need ON
   ranInterworingRSRQThreshold RSRQ-Range OPTIONAL, -- Need ON
   wlanInterworkingRSSIThreshold INTEGER (0..255) OPTIONAL, -- Need ON
   wlanInterworkingRCPIThreshold INTEGER (0..220) OPTIONAL, -- Need ON
   wlanInterworkingRSNIThreshold INTEGER (0..220) OPTIONAL, -- Need ON
   wlanInterworkingBSSLoadThreshold INTEGER (0..255) OPTIONAL, -- Need ON
   wlanInterworkingWANDLSpeedThreshold INTEGER (0.. 4294967296)
OPTIONAL, -- Need ON
   wlanInterworkingWANULSpeedThreshold INTEGER (0..4294967296) OPTIONAL,
-- Need ON
   wlanInterworkingWANDLLoadThreshold INTEGER (0..255) OPTIONAL,
-- Need ON
   wlanInterworkingWANULLoadThreshold INTEGER (0..255) OPTIONAL,
-- Need ON
   wlanInterworkingAPindicator ENUMERATED {true} OPTIONAL, -- Need ON
   wlanInterworkingAPList SEQUENCE (SIZE (1..4)) OF wlanInterworkingAP
OPTIONAL, -- Need ON
   wlanInterworkingBSSIDList SEQUENCE (SIZE (1..16)) OF
wlanInterworkingBSSID       OPTIONAL, -- Need ON
   wlanInterworkingBSSIDBlackList SEQUENCE (SIZE (1..16)) OF
wlanInterworkingBSSID       OPTIONAL, -- Need ON
   wlanInterworkingChannelList SEQUENCE (SIZE (1..16)) OF
wlanInterworkingChannel     OPTIONAL, -- Need ON
}
wlanInterworkingSSID OCTET STRING (SIZE (32)),
wlanInterworkingBSSID BIT STRING (SIZE (48)),
wlanInterworkingChannel INTEGER (1..255),
wlanInterworkingAP ::= SEQUENCE {
   wlanInterworkingBSSID BIT STRING (SIZE (48)),
   wlanInterworkingChannel INTEGER (1..255), OPTIONAL,
   wlanInterworkingAPversion ENUMERATED {802.11b, 802.11g, 802.11a, 802.11n,
802.11ac} OPTIONAL,
   wlanInterworkingAPSupportedRateList SEQUENCE (SIZE (1..8)) OF
wlanInterworkingAPSupportedRate, OPTIONAL,
   ellipsoid-Point-r10 OCTET STRING,
}
wlanInterworkingAPSupportedRate INTEGER (2..127),
-- ASN1STOP
```

Figure 8:
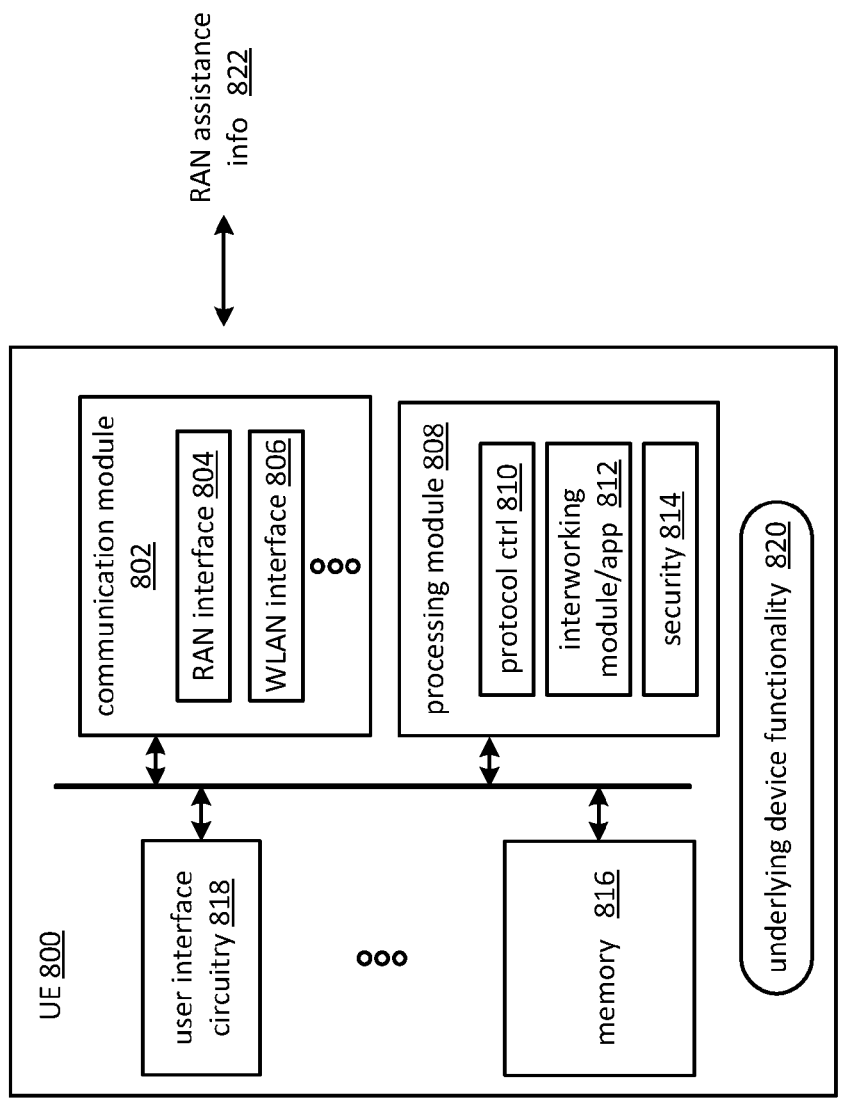
FIG. 8 is a functional block diagram illustrating an exemplary embodiment of a user equipment (UE) device capable of receiving and utilizing broadcast RAN assistance information.

FIG. 8 is a functional block diagram illustrating an exemplary embodiment of a user equipment (UE) 800 capable of receiving and utilizing broadcast RAN assistance information. The illustrated UE 800, which may be any of a wide variety of multimode capable devices such as those described above, includes one or more communication modules 802 having a RAN interface 804 and a WLAN interface 806. The communication module 802 may include further communication interfaces compliant with one or more additional standards such as Bluetooth, NFC, etc., and/or proprietary communication protocols.

The illustrated UE 800 further includes a processing module 808 coupled to the communication module 802 and memory 816. The processing module may perform various device functions, including protocol control 810 and security 814 functions. An interworking module/application 812 may also be supported by the processing module 808.

In addition to other functionality, the processing module 808 and memory 816 are configured to support RAN and WLAN interworking operations such as those described above. The interworking operations may be based, at least in part, on RAN assistance information 822 communicated via the RAN interface 804 and/or WLAN interface 806.

In the illustrated embodiment, the UE 800 further includes underlying device functionality 820 and user interface circuitry 818 for interfacing with one or more input devices such as a keyboard, keypad, microphone, biometric sensor, touchscreen, etc. For data received via the user interface circuitry 818, the processing module 808 may perform a corresponding host function on the data and/or route it to a communication interface (e.g., for use in assisting or overriding interworking operations).

As noted, the various embodiments of the disclosure described above may be based on existing 3GPP broadcast signaling frameworks to support WLAN/3GPP radio interworking scenarios. A given implementation may generally depend on the particular standard or standards utilized by a RAN and/or WLAN. In accordance with the disclosure, unique use cases and characteristics of different parameters are accommodated to ensure backward compatibility and address legacy UE battery consumption issues. In addition, in certain embodiments, a paging channel is not overloaded when supporting RAN assistance information. A new flag in paging messages is described, as well as RAN assistance information in new SIB types according to the characteristics of such information. In some instances, structures and components have been illustrated above in block diagram form in order to avoid obscuring the concepts of the subject technology.

As may be used herein, the term "associated with", includes direct and/or indirect association of separate items and/or one item being embedded within another item. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to" or "operably coupled to" indicates that an item includes one or more of power connections, input(s), output(s), etc., to perform, when activated, one or more its corresponding functions and may further include inferred coupling to one or more other items.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

As may also be used herein, the terms "processing module", "processing circuit", "processing circuitry", "processor" and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of the present disclosure have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed subject matter. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the claimed subject matter. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contrary, signals to, from, and/or between elements in a figure presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method of interworking between a cellular radio area network (RAN) and a wireless local area network (WLAN), comprising:
    transmitting RAN assistance information from the RAN for use by a multimode user equipment (UE), the RAN assistance information relating to network selection and traffic steering operations, including:
        transmitting first RAN assistance information to the UE in accordance with a first system information broadcast procedure; and
        transmitting second RAN assistance information to the UE in accordance with a second system information broadcast procedure, wherein the second system information broadcast procedure includes a paging message, and wherein at least a portion of the second RAN assistance information is generated in a format that changes less frequently over time in comparison to the format of a corresponding portion of the first RAN assistance information.

2. The method of claim 1, wherein the paging message includes a flag indicating a change in the second RAN assistance information.

3. The method of claim 1, the RAN assistance information including RAN load assistance information that provides an indication of RAN traffic load, wherein:

when included in the first RAN assistance information, the RAN load assistance information is provided in a first format; and when included in the second RAN assistance information, the RAN load assistance information is provided in a second format that is less granular than the first format.

4. The method of claim 3, wherein the first format is a numeric percentage format and the second format is a pre-set load level format.

5. The method of claim 1, the RAN and the WLAN operated or controlled by a common service provider.

6. The method of claim 1, wherein the RAN is implemented in accordance with at least one version of a 3GPP LTE/LTE-advanced standard, and the WLAN is implemented in accordance with at least one version of an IEEE 802 wireless communication standard.

7. The method of claim 6, wherein the first RAN assistance information includes at least one of:
RAN threshold information;
WLAN threshold information;
WLAN identifier information; or
offload preference indicator (OPI) information.

8. The method of claim 6, wherein at least a portion of the first RAN assistance information is included in a system information block (SIB) mapped to a first system information (SI) message.

9. The method of claim 8, wherein at least a portion of the second RAN assistance information is included in a SIB mapped to a second SI message.

10. The method of claim 1, further comprising:
detecting a new value for previously transmitted RAN assistance information; and
transmitting the new value in accordance with the first system information broadcast procedure or the second system information broadcast procedure.

11. A method of interworking between a cellular radio area network (RAN) and a wireless local area network (WLAN), comprising:
receiving, by a multimode user equipment (UE), RAN assistance information for use in performing interworking operations by the UE, including:
receiving first RAN assistance information broadcast in accordance with a first RAN system information broadcast procedure;
receiving second RAN assistance information broadcast in accordance with a second RAN system information broadcast procedure, wherein the second RAN system information broadcast procedure includes a paging message having a RAN assistance information change notification, and wherein at least a portion of the second RAN assistance information is in a format having values that change less frequently over time in comparison to the format of a corresponding portion of the first RAN assistance information; and
utilizing the RAN assistance information for interworking-related operations.

12. The method of claim 11, wherein receiving the second RAN assistance information includes:
in response to the paging message, initiating a system information acquisition procedure to retrieve the second RAN system information.

13. The method of claim 11, the RAN assistance information including RAN load assistance information, wherein:
receiving the first RAN assistance information includes receiving the RAN load assistance information in a first format, and receiving the second RAN assistance information includes receiving the RAN load assistance information in a second format.

14. The method of claim 13, wherein the first format is a numeric percentage format and the second format is a pre-set load level format.

15. The method of claim 11, the RAN implemented in accordance with at least one version of a 3GPP LTE/LTE-advanced standard, the WLAN implemented in accordance with at least one version of an IEEE 802 wireless communication standard, wherein:
at least a portion of the first RAN assistance information is included in a system information block (SIB) mapped to a first system information (SI) message, and
at least a portion of the second RAN assistance information is included in a SIB mapped to a second SI message.

16. The method of claim 15, wherein the first RAN assistance information includes at least one of:
RAN threshold information;
WLAN threshold information;
WLAN identifier information; or
offload preference indicator (OPI) information.

17. A multimode device supporting communications over a radio area network (RAN) and a wireless local area network (WLAN), comprising:
a RAN communication interface;
a WLAN communication interface; and
a processing module coupled to the RAN communication interface and the WLAN communication interface, the processing module configured to support RAN and WLAN interworking operations based at least in part on RAN assistance information, the RAN and WAN interworking operations including:
receiving, via the RAN communication interface, first RAN assistance information broadcast in accordance with a first RAN system information broadcast procedure; and
receiving, via the RAN communication interface, second RAN assistance information broadcast in accordance with a second RAN system information broadcast procedure, wherein the second RAN system information broadcast procedure includes a paging message, and wherein at least a portion of the second RAN assistance information is in a format having values that change less frequently over time in comparison to the format of a corresponding portion of the first RAN assistance information.

18. The multimode device of claim 17, wherein receiving the second RAN assistance information includes initiating a system information acquisition procedure in response to the paging message.

19. The multimode device of claim 17, the RAN communication interface configured to support at least one version of a 3GPP LTE/LTE-advanced standard, the WLAN communication interface configured to support at least one version of an IEEE 802 wireless communication standard, wherein:
at least a portion of the first RAN assistance information is included in a system information block (SIB) mapped to a first system information (SI) message, and
at least a portion of the second RAN assistance information is included in a SIB mapped to a second SI message.

20. The multimode device of claim 19, wherein:
the first RAN assistance information includes at least one
of:
  RAN threshold information;
  WLAN threshold information;
  WLAN identifier information; or
  offload preference indicator (OPI) information, and
the second RAN assistance information includes RAN
  load assistance information.

* * * * *